June 16, 1959 J. R. COOPER 2,891,186
SEALED BEAM HEADLIGHT
Filed Sept. 11, 1957

John R. Cooper
INVENTOR

BY *C. A. Snow & Co.*
ATTORNEYS.

United States Patent Office 2,891,186
Patented June 16, 1959

2,891,186

SEALED BEAM HEADLIGHT

John Reed Cooper, Elizabeth, W. Va.

Application September 11, 1957, Serial No. 683,298

3 Claims. (Cl. 313—113)

This invention relates to headlights, the primary object of the invention being to provide a sealed beam headlight which is so constructed that the light rays from the headlight will be projected in such a way as to avoid objectionable glare.

Another object of the invention is to provide a headlight which will confine the light rays projected from the headlight to an area below the windshield and below the line of vision of operators of approaching vehicles, and at the same time provide for the adequate illumination of the road surface.

A further object of the invention is to transform the usual widely distributed beam from a headlight into an elongated beam projected a substantial distance beyond the headlight and below the line of vision of the drivers of approaching vehicles eliminating glare.

With the foregoing and other objects in view which will appear as the description proceeds, the invention consists of certain novel details of construction and combinations of parts, hereinafter more fully described and pointed out in the claims, it being understood that changes may be made in the construction and arrangements of parts without departing from the spirit of the invention as claimed.

Referring to the drawing.

Figure 1:
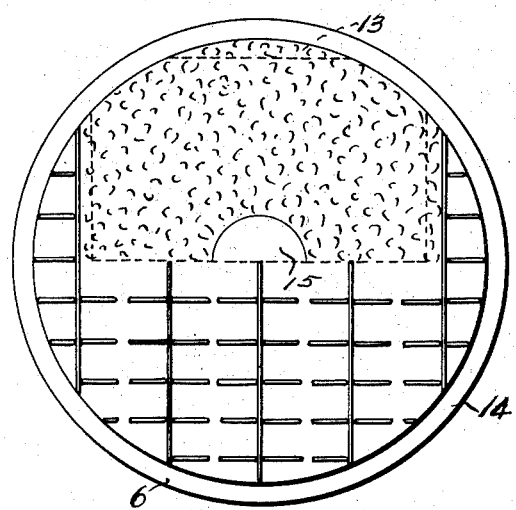
Figure 1 is a front elevational view of a sealed beam headlight, constructed in accordance with the invention.
Figure 2:
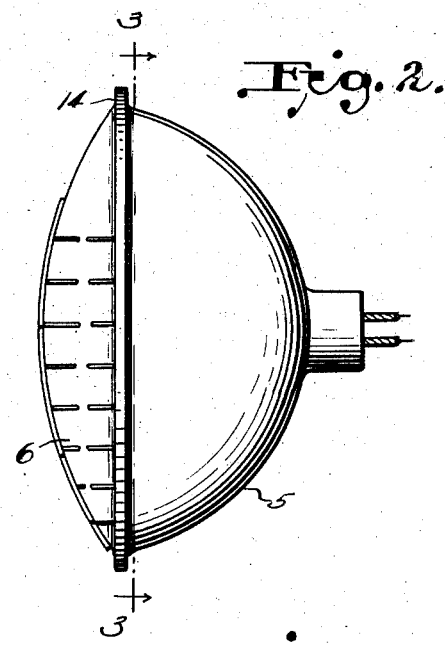
Fig. 2 is a side elevational view thereof.
Figure 3:
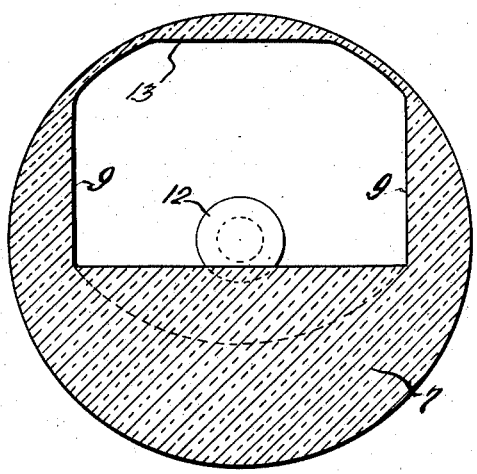
Fig. 3 is a sectional view taken on line 3—3 of Fig. 2.

Refering to the drawing in detail, the headlight which is of the sealed beam type, comprises a generally spherical glass body 5 having two outwardly concaved faces of differing radii of curvature, the convexed front wall 6 of said body constituting the lens of the light.

As shown, the body 5 is formed with a lower solid portion 7 that has its inner surface 8 transversely curved with the side edges of said transversely curved surface merging with the substantially straight surfaces of the solid side portions 9 of the interior of the body.

Figure 4:
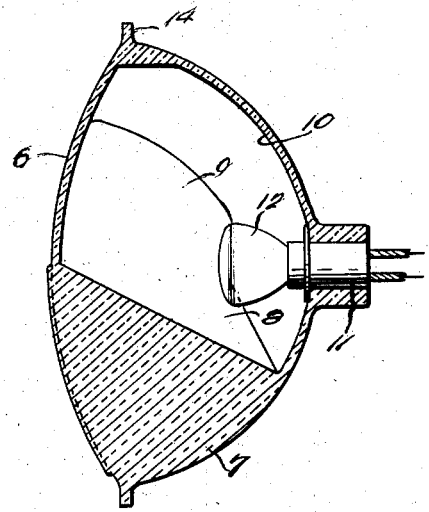
Fig. 4 is a vertical sectional view through the body portion of the sealed beam headlight.

These side portions 9 of the inner surface of the headlight merge with the curved surface 10 which is treated to provide a highly reflective surface which extends over the entire surface 10 and surfaces 8 and 9, as better shown by Fig. 4 of the drawings.

The usual lamp socket 11 is provided for the reception of the lamp 12 which is shown so located that the front edge of the curved surface 8 lies in a line with the longitudinal axis of the lamp 12, thereby shielding the beam and confining the light rays to that area and below the line of vision to properly illuminate the road surface for safe driving by eliminating glare as produced by the conventional sealed beam headlight.

A portion of the front wall 6 of the body which constitutes the lens of the light, is stippled and tinted throughout the major portion of its area to diffuse and soften rays projected from lamp 12. As better shown by Fig. 1, the stippling of the lens is arranged to provide a semi-circular clear section 15 directly in front of the lamp 12.

The reference character 13 indicates a solid section of the sealed beam headlight, which extends across the upper surface of the body presenting a reflecting surface at the top of the light reflecting light rays downwardly.

In the formation of the body 5, an annular rib 14 is provided for securing the headlight within its support.

From the foregoing it will be seen that due to the construction shown and described, the light rays or beam of light from the bulb 12 will be confined to an area below the line of vision of operators of approaching vehicles, and that the reflecting surface provided by the solid section 13 will tend to prevent light rays from being projected upwardly while the solid side portions 9 confine the light beam to a substantially narrow area directly over the road surface over which the vehicle is traveling.

Having thus described the invention, what is claimed is:

1. In a headlight of the sealed beam type, a parabolic hollow glass body, including outwardly convexed front and rear walls, an integral solid lower section formed within said body, extending downwardly from a point on the front wall of the body on a line with the horizontal axis of said body and merging with the rear wall of said body, the upper surface of said integral solid lower section being downwardly concaved providing a reflector continuous with the rear wall of said body, and said rear wall of the body being coated with a highly reflecting material providing a reflector.

2. In a headlight of the sealed beam type, a generally spherical glass body including outwardly convexed front and rear walls formed with an integral solid lower section having a downwardly concaved upper reflecting surface, solid side sections having reflecting surfaces merging with the ends of the concaved reflecting surface of said integral solid lower section, said side sections terminating at points adjacent to the top of said body, and an electric lamp supported within said body, the upper edges of said solid lower section being disposed in a line with the horizontal axis of said electric lamp.

3. In a headlight of the sealed beam type, a generally spherical hollow glass body including outwardly convexed front and rear walls, said front wall of said body providing the lens of the headlight, a solid integral forward section forming an integral part of said lens, the upper surface of said solid integral forward section being inclined downwardly rearwardly and downwardly concaved in a direction transverse to the plane of the incline providing a reflecting surface, portions of said solid sections extending upwardly at the sides of said body merging with the body adjacent to the top thereof, the surfaces of said sections extending upwardly presenting reflecting surfaces.

References Cited in the file of this patent

UNITED STATES PATENTS

| 1,811,782 | Duncan | June 23, 1931 |
| 2,171,336 | Hayden | Aug. 29, 1939 |
| 2,398,969 | Singer | Apr. 23, 1946 |
| 2,398,970 | Singer | Apr. 23, 1946 |
| 2,398,971 | Singer | Apr. 23, 1946 |
| 2,686,269 | Levitt et al. | Aug. 10, 1954 |
| 2,749,482 | Fruengel | June 5, 1956 |